Oct. 3, 1933.  A. J. MEYER  1,929,206

ENGINE

Filed April 30, 1930

INVENTOR.

Andre J. Meyer

BY W. W. Harris

ATTORNEY.

Patented Oct. 3, 1933

1,929,206

UNITED STATES PATENT OFFICE 1,929,206

ENGINE

Andre J. Meyer, Detroit, Mich., assignor to Continental Motors Corporation, Detroit, Mich., a corporation of Virginia Application April 30, 1930. Serial No. 448,514

5 Claims. (Cl. 74—6)

My invention relates to vibration dampers and more particularly to crankshaft torsional vibration dampers of the friction type.

Most vibration dampers of the friction type are constructed with a friction element which is subjected to a predetermined pressure for yieldingly engaging the frictional element with the damper elements. These prior constructions are objectionable for the reason that they do not uniformly dampen vibrations in engines that are operated at various speeds. In order to obtain a uniform dampening of the torsional vibrations, it is necessary to increase the frictional forces between the friction element and the damper element to which it is yieldingly engaged as the speed of the engine increases, and in most cases the said frictional forces are not increased resulting in an inefficient dampening of the crankshaft vibrations at relatively high engine speeds.

It is the object of my invention to construct a crankshaft torsional vibration damper that is efficiently operated at various engine speeds by providing a frictional element therefor that is automatically expanded at relative high engine speeds to increase the frictional forces between the friction element and the damper element to which it is yieldingly engaged.

Another object of my invention is to provide a uniform resistance to torsional crankshaft vibrations at various engine speeds by providing a vibration damper of the friction type constructed with a self energizing frictional element that automatically increases the frictional engagement of the friction element with the damper element yieldingly engaged thereby as the speed of the engine is increased.

A further object of my invention is to construct an improved torsional crankshaft vibration damper of the friction type having an expanding friction element by providing means for subjecting the friction element to an initial pressure causing the same to engage an adjoining damper element with a predetermined initial pressure.

A still further object of my invention is to construct a torsional crankshaft vibration damper of a minimum number of parts which can be conveniently and readily assembled with a minimum of time and labor.

Figure 3:
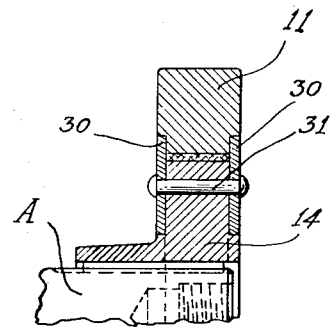
Figure 1:
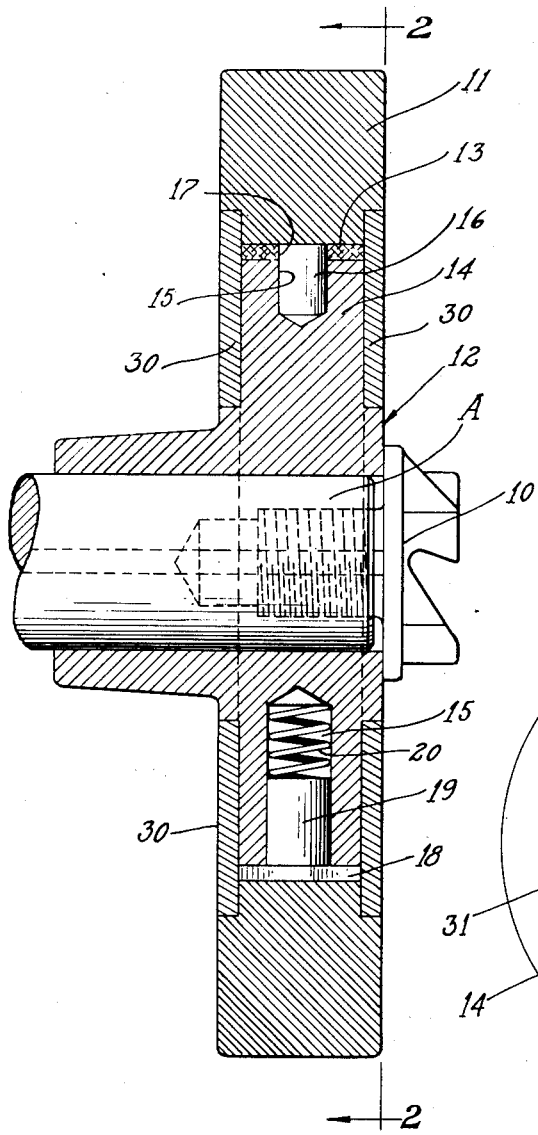
Figure 2:
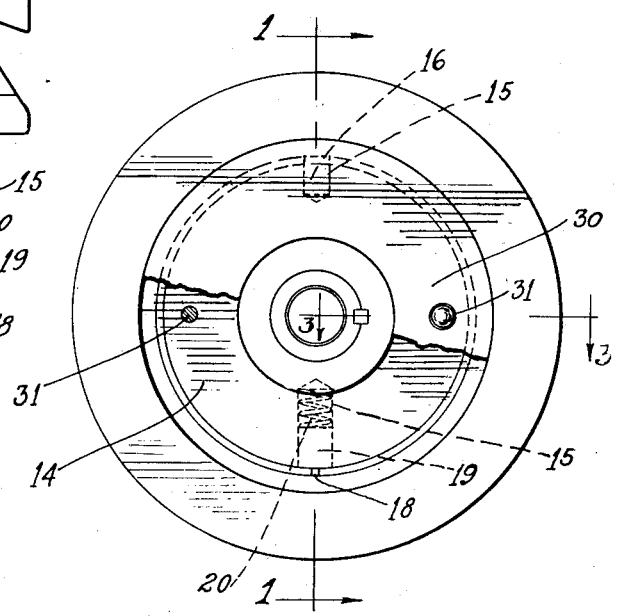

For a more detailed understanding of my invention, reference may be had to the accompanying drawing which illustrates one form which my invention may assume, and in which:

Fig. 1 is a longitudinal sectional view through a vibration damper constructed in accordance with my invention, and taken substantially on the line 1—1 of Fig. 2, Fig. 2 is a sectional elevational view taken substantially on the line 2—2 of Fig. 1 with the starter element removed and some of the parts broken away to show the interior construction, and Fig. 3 is a detail sectional view taken on the line 3—3 of Fig. 2.

My improved torsional crankshaft vibration damper is mounted on the front end of an engine crankshaft A in the usual manner, a starter element 10 being secured to the end of the crankshaft and provided with a flange that engages the vibration damper to retain the same in position.

The vibration damper comprises a flywheel or inertia member 11, a driving hub 12 keyed or otherwise fixed to the crankshaft, and a self energizing friction element 13 for yieldingly connecting the inertia member with the driving hub.

The driving hub is provided with a circular body portion 14 having a pair of recesses 15 preferably arranged diametrically opposite to each other. The friction element comprises a split metal ring which is arranged to surround the circular body portion of the driving hub. Preferably a dowel pin 16 is inserted through an aperture 17 in the ring, said aperture preferably located diametrically opposite to the split 18 in the ring, the dowel pin being preferably rigidly supported in one of the recesses 15, the ring being capable of radial movement relative to the dowel pin 16. Thus the friction element or ring is fixed at the anchor point to the driving hub against relative movement circumferentially thereof but not against relative radial movement.

A plunger 19 is slidably supported in the other recess 15, a relatively light spring 20 inserted behind the plunger to exert a light yielding pressure radially outwardly against the plunger. The plunger 19 is located adjacent to the split in the friction ring and is so positioned and arranged as to yieldingly engage both free ends of the ring to exert an initial pressure on the friction element or ring. The friction ring is preferably constructed of spring steel or some other suitable resilient material. The spring pressed plunger is utilized to exert an initial pressure on the free ends of the split friction ring, but the plunger and spring can be omitted if the ring is constructed with a sufficient resiliency that tends to expand the ring, this internal spring tension of the ring providing the necessary initial pressure.

The operation of the device is as follows: When torsional vibration is set up in the crankshaft causing alternating acceleration and deacceleration of the inertia member with respect to the driving hub to which it is yieldingly connected, the friction element or ring is actuated to dampen out the vibrations. Relative movement of the inertia member in one direction with respect to the driving hub causes one half of the spring friction ring to expand outwardly and to engage the inertia member with a force, the pressure in said section of the ring building up from a minimum at the point at which initial pressure is applied to a maximum at the point where said frction ring is anchored or otherwise secured against angular movement. A friction member that operates in the manner as described above is commonly referred to as a self energizing friction element. Relative movement of the inertia element in an opposite direction will energize the other half of the friction ring.

Torsional vibrations in the engine crankshaft tending to cause this relative movement between the inertia member and the driving hub will be quickly dampened out and absorbed by the self energizing friction element or ring which yieldingly connects the inertia member with the driving hub.

It will also be seen that the friction element or ring will expand as the velocity of the engine crankshaft increases. The centrifugal force equals mass times velocity squared divided by the radius $$\left(F = \frac{MV^2}{r}\right).$$

Therefore F varies as the square of the velocity and as the speed of the engine increases the friction ring exerts an increased frictional force on the inertia member, thereby varying the initial pressure in accordance with the speed of the engine.

The side plates or rings 30 are riveted or otherwise secured as at 31 to the driving hub to secure the friction ring and inertia member to the hub, said rings 30 also rotatably supporting the inertia member.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. A vibration damper for engine crankshafts comprising a driving hub fixed to the crankshaft, an inertia member rotatably supported by the driving hub, a self energizing friction element for yieldingly connecting the inertia member with said driving hub, and a dowel pin for securing the friction element to said driving hub to secure the said element against relative circumferential movement with respect to said hub, said pin permitting relatively radial movement of said friction element relative to said hub at the point where said element is anchored thereto.

2. A vibration damper for engine crankshaft comprising a driving hub fixed to the crankshaft, an inertia member rotatably supported by the driving hub, a self energizing split friction ring fixed to said driving hub against relative circumferential movement therewith for yieldingly connecting the hub with the inertia member, and means engaging the free ends of said split friction ring for exerting a yielding initial pressure radially outwardly against the ring portions engaged thereby.

3. A vibration damper for engine crankshaft comprising a driving hub fixed to the crankshaft, an inertia member rotatably supported by the driving hub, a self energizing split friction ring fixed to said driving hub against relative circumferential movement therewith for yieldingly connecting the hub with the inertia member, and a spring pressed plunger engaging the free ends of said split friction ring for exerting a yielding initial pressure radially outwardly against the ring portions engaged thereby.

4. A vibration damper for engine crankshafts comprising a driving hub fixed to the crankshaft, an inertia member rotatably supported by the driving hub, a self energizing split friction ring for yieldingly connecting the hub with the inertia member, a dowel pin for securing the ring to said driving hub to fix the said ring against relative circumferential movement with respect to said hub, said dowel pin located substantially diagrammatically opposite the split in said ring, and a spring pressed plunger engaging the free ends of said split friction ring for exerting a yielding initial pressure radially outwardly against the ring portions engaged thereby.

5. A vibration damper for engine crankshafts comprising a driving member fixed to the crankshaft, an inertia member, a friction element for yieldingly connecting the inertia member with said driving hub, means anchoring said element to one of said members against relative circumferential movement therewith but free for relative radial movement therewith, and means applying an initial pressure at point or points remote from anchor point whereby in operation pressure between said friction element and member associated therewith increases from point where initial pressure is applied to point adjacent where said element is anchored to said member.

ANDRE J. MEYER.